United States Patent [19]
Klatt et al.

[11] Patent Number: 6,103,797
[45] Date of Patent: Aug. 15, 2000

[54] FLAME-PROOFED MOULDING MATERIALS

[75] Inventors: Martin Klatt, Mannheim; Brigitte Gareiss, Obersülzen; Motonori Yamamoto, Mannheim, all of Germany

[73] Assignee: BASF Aktiengesellschaft, Ludwigshafen, Germany

[21] Appl. No.: 09/284,416

[22] PCT Filed: Oct. 10, 1997

[86] PCT No.: PCT/EP97/05605

§ 371 Date: Apr. 14, 1999

§ 102(e) Date: Apr. 14, 1999

[87] PCT Pub. No.: WO98/17719

PCT Pub. Date: Apr. 30, 1998

[30] Foreign Application Priority Data

Oct. 21, 1996 [DE] Germany .......................... 196 43 279

[51] Int. Cl.⁷ ........................................... C08K 3/32
[52] U.S. Cl. .................... 524/141; 524/601; 524/605; 524/101; 524/139; 524/137; 524/154; 524/442; 428/921
[58] Field of Search ....................... 524/601, 605, 524/101, 141, 139, 137, 154, 442; 428/921

[56] References Cited

U.S. PATENT DOCUMENTS

| | | | |
|---|---|---|---|
| 3,609,118 | 9/1971 | Pitz | 524/154 |
| 3,671,487 | 6/1972 | Abolins | 524/141 |
| 4,180,496 | 12/1979 | Yanagimoto et al. | 524/101 |
| 4,866,114 | 9/1989 | Taubitz et al. | 524/100 |

FOREIGN PATENT DOCUMENTS

| | | |
|---|---|---|
| 501 162 | 9/1992 | European Pat. Off. |
| 2 250 291 | 6/1992 | United Kingdom. |

OTHER PUBLICATIONS

JP Abstract 3/281652.
JP Abstract 5/070671.

*Primary Examiner*—Robert Dawson
*Assistant Examiner*—Kuo-Liang Peng
*Attorney, Agent, or Firm*—Keil & Weinkauf

[57] ABSTRACT

Thermoplastic molding compositions comprise
A) from 30 to 97% by weight of a polyester,
B) from 1 to 30% by weight of melamine cyanurate,
C) from 1 to 30% by weight of at least one phosphorus-containing flame retardant which contains phosphorus in the valence state −1, −2 or −3,
D) from 0 to 60% by weight of other additives and processing aids, where the total of the percentages by weight of components A) to D) is 100%.

9 Claims, No Drawings

FLAME-PROOFED MOULDING MATERIALS

The invention relates to thermoplastic molding compositions comprising

A) from 30 to 97% by weight of a polyester,
B) from 1 to 30% by weight of melamine cyanurate,
C) from 1 to 30% by weight of at least one phosphorus-containing flame retardant which contains phosphorus in the valence state −1, −2 or −3,
D) from 0 to 60% by weight of other additives and processing. aids, where the total of the percentages by weight of components A) to D) is 100%.

The invention also relates to the use of the novel molding compositions to produce fibers, films or shaped articles, and to the shaped articles of any type thus obtained.

The market shows increasing interest in halogen-free flame-retardant polyesters. Important requirements of the flame retardant are: pale intrinsic color, sufficient thermal stability for incorporation in thermoplastics, and its efficacy in reinforced and non-reinforced polymers (wicking effect of glass fibers).

The UL 94 flammability test should be passed at the V-0 level for non-reinforced polyesters.

For reinforced polyester, it is sufficient for many applications that the glowing-wire test is passed.

In principle, besides halogen-containing systems, four halogen-free FR systems are used in thermoplastics:

Inorganic flame retardants which must be employed in large amounts to be effective.

Nitrogen-containing FR systems with melamine cyanurate, which has limited efficacy in thermoplastics, eg. polyamide. In reinforced polyamide, it is effective only in combination with shortened glass fibers. In polyesters, melamine cyanurate is not effective.

Phosphorus-containing FR systems, which are generally not very effective in polyesters.

Phosphorus/nitrogen-containing FR systems, eg. ammonium polyphosphates or melamine phosphates, which have insufficient thermal stability for thermoplastics processed above 200° C.

JP-A 03/281 652 discloses polyalkylene terephthalates containing melamine cyanurate and glass fibers and also a phosphorus-containing flame retardant. The latter contains phosphoric acid derivatives, such as phosphoric acid esters (valence state +5), which when subjected to thermal stress cause transesterification of the polyester and degradation of the polymer matrix.

These disadvantages are also apparent for the combination of melamine cyanurate with resorcinol bis (diphenylphosphate) disclosed in JP-A 05/070 671.

It is an object of the present invention to provide flame-retardant polyester molding compositions which achieve the UL 94 classification V-0 or pass the glowing-wire test. They should be capable of being processed with virtually no degradation or transesterification of the polymer matrix.

We have found that this object is achieved by means of the thermoplastic molding compositions defined at the outset. Preferred embodiments are given in the subclaims.

The novel molding compositions comprise, as component (A), from 30 to 97% by weight, preferably from 40 to 93% by weight, and in particular from 50 to 85% by weight, of a thermoplastic polyester.

Polyesters which are used are generally based on aromatic dicarboxylic acids and an aliphatic or aromatic dihydroxy compound.

A first group of preferred polyesters consists of polyalkylene terephthalates having from 2 to 10 carbon atoms in the alcohol moiety.

Polyalkylene terephthalates of this type are known per se and are described in the literature. They contain, in their main chain, an aromatic ring which derives from the aromatic dicarboxylic acid. The aromatic ring may also be substituted, for example with halogen, such as chlorine or bromine, or with $C_1$–$C_4$-alkyl, such as methyl, ethyl, isopropyl or n-propyl, n-butyl, isobutyl or tert-butyl.

These polyalkylene terephthalates can be prepared by reaction of aromatic dicarboxylic acids, their esters or other ester-forming derivatives with aliphatic dihydroxy compounds, in a manner known per se.

Preferred dicarboxylic acids are, for example, 2,6-naphthalenedicarboxylic acid, terephthalic acid and isophthalic acid or mixtures of these. Up to 30 mol%, preferably not more than 10 mol%, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylanol and neopentyl glycol, and mixtures of these.

Particularly preferred polyesters (A) are, for example, polyalkylene terephthalates derived from alkanediols having from 2 to 6 carbon atoms. Of these, special preference is given to polyethylene terephthalate and polybutylene terephthalate or mixtures of these.

The viscosity number of the polyesters (A) is generally in the range from 70 to 220, preferably from 100 to 150 ml/g (measured in a 0.5% strength by weight solution in a mixture of phenol and o-dichlorobenzene (weight ratio 1:1) at 25° C.

Particular preference is given to polyesters whose content of carboxyl end groups is up to 100 mval/kg, preferably up to 50 mval/kg, and especially up to 40 mval/kg of polyester. Polyesters of this type may be prepared, for example, by the process of DE-A-44 01 055. The content of carboxyl end groups is usually determined by titration methods (eg. potentiometry).

A further group which may be mentioned is that of the fully aromatic polyesters derived from aromatic dicarboxylic acids and aromatic dihydroxy compounds.

Suitable aromatic dicarboxylic acids are the compounds described above in relation to polyalkylene terephthalates. Preference is given to mixtures of from 5 to 100 mol% of isophthalic acid and from 0 to 95 mol% of terephthalic acid, in particular mixtures of from about 80 to about 50% of terephthalic acid with about 20 to about 50% of isophthalic acid.

The aromatic dihydroxy compounds preferably have the formula I

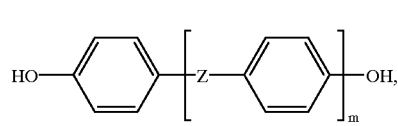

where Z is alkylene or cycloalkylene having up to 8 carbon atoms, arylene having up to 12 carbon atoms, carbonyl, sulfonyl, an oxygen or sulfur atom, or a chemical bond, and where m is from 0 to 2. Compounds I may also carry $C_1$–$C_6$-alkyl or -alkoxy and fluorine, chlorine or bromine as substituents on the phenylene groups.

Representative compounds are, for example, dihydroxydiphenyl, di(hydroxyphenyl)alkane, di(hydroxyphenyl)cycloalkane, di(hydroxyphenyl) sulfide, di(hydroxyphenyl) ether, di(hydroxyphenyl) ketone, di(hydroxyphenyl) sulfoxide, α, α'-di(hydroxyphenyl)dialkylbenzene, di(hydroxyphenyl) sulfone, di(hydroxybenzoyl)benzene, resorcinol and hydroquinone and their ring-alkylated and ring-halogenated derivatives.

Of these, preferred compounds are 4,4'-dihydroxydiphenyl, 2,4-di(4'-hydroxyphenyl)-2-methylbutane, α, α'-di(4-hydroxyphenyl)-p-diisopropylbenzene, 2,2-di(3'-methyl-4'-hydroxyphenyl)propane and 2,2-di(3'-chloro-4'-hydroxyphenyl)propane, and in particular 2,2-di(4'-hydroxyphenyl)propane, 2,2-di(3',5-dichlorodihydroxyphenyl)propane, 1,1-di(4'-hydroxyphenyl)cyclohexane, 3,4'-dihydroxybenzophenone, 4,4'-dihydroxydiphenyl sulfone and 2,2-di(3', 5'-dimethyl-4'-hydroxyphenyl)propane and mixtures of these.

It is also possible, of course, to employ mixtures of polyalkylene terephthalates and fully aromatic polyesters. These generally include from 20 to 98% by weight of the polyalkylene terephthalate and from 2 to 80% by weight of the fully aromatic polyester.

For the purposes of the present invention, polyesters are also intended to include polycarbonates which can be obtained by polymerization of aromatic dihydroxy compounds, in particular 2,2-bis(4-hydroxyphenyl)propane (bisphenol A) and its derivatives, for example with phosgene. Corresponding products are known per se and are described in the literature, and are mostly also commercially available. The amount of the polycarbonates is up to 90% by weight, preferably up to 50% by weight, based on 100% by weight of component (A).

Polyester block copolymers, such as copolyether esters, may, of course, also be used. Products of this type are known per se and are described in the literature, for example in U.S. Pat. No. 3,651,014. Corresponding products are also commercially available, for example Hytrel® (DuPont).

The preferred partially aromatic copolyamides with low triamine content can be prepared by the processes described in EP-A 129 195 and 129 196.

The novel thermoplastic molding compositions comprise, as component B), from 1 to 30% by weight, preferably from 1 to 20% by weight, and in particular from 5 to 15% by weight, of melamine cyanurate as flame retardant.

The melamine cyanurate used in the invention (component B) is a reaction product of preferably equimolar amounts of melamine (formula I) and cyanuric acid or isocyanuric acid (formulae IIa and IIb).

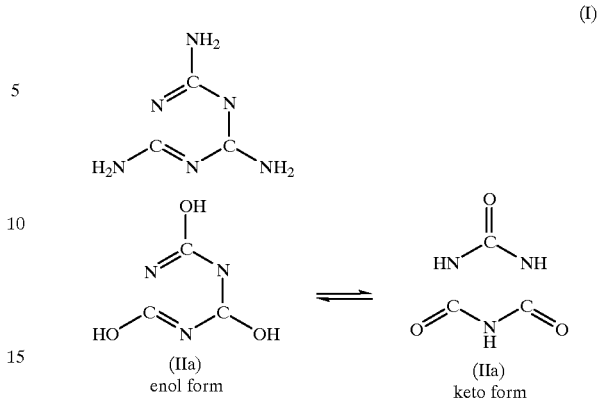

It is obtained, for example, by reaction of aqueous solutions of the starting materials at from 90 to 100° C. The commercially available product is a white powder with a mean particle size $d_{50}$ of 69 μm.

Suitable flame retardants C) are present in the novel molding compositions in amounts of from 1 to 30% by weight, preferably from 1 to 25% by weight, and in particular from 10 to 20% by weight.

Component C) is an organic or inorganic phosphorus-containing compound in which the phosphorus has a valence state from −3 to −1. The term valence state is taken to mean oxidation state, as given in "Lehrbuch der Anorganischen Chemie" by A. F. Hollemann and E. Wiberg, Walter des Gruyter and Co. (1964, 57th to 70th Edition), pp. 166–177. Phosphorus compounds of valence states from −3 to −1 are derived from phosphine (−3), diphosphine (−2) and phosphine oxide (−1).

From the large number of phosphorus-containing compounds, only a few examples are mentioned.

Examples of phosphorus compounds of the phosphine class, having the valence state −3, are aromatic phosphines, such as, inter alia, triphenyl phosphine, tritolyl phosphine, trinonyl phosphine, and trinaphthyl phosphine. Triphenyl phosphine is particularly suitable.

Examples of phosphorus compounds of the diphosphine class, having the valence state −2, are, inter alia, tetraphenyldiphosphine and tetranaphthyldiphosphine. Tetranaphthyldiphosphine is particularly suitable.

Phosphorus compounds of the valence state −1 are derived from phosphine oxide.

The novel molding compositions preferably comprise at least one phosphine oxide of the formula I

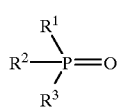

where $R^1$, $R^2$ and $R^3$ are identical or different alkyl, aryl, alkylaryl or cycloalkyl having from 8 to 40 carbon atoms.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl)phosphine oxide, benzylbisphenylphosphine oxide and phenylbis(n-hexyl)phosphine oxide. Particular preference is given to using triphenylphosphine oxide, tricyclohexylphosphine oxide, tris(n-octyl)phosphine oxide and tris(cyanoethyl)phosphine oxide.

Compounds which are likewise preferred are triphenylphosphine sulfide and its derivatives described above.

The novel molding compositions may contain, as component D), from 0 to 60% by weight and in particular up to 50% by weight, of further additives and processing aids.

Conventional additives are, for example, elastomeric polymers (often also referred to as impact modifiers, elastomers or rubbers) in amounts of up to 40% by weight, preferably up to 30% by weight.

These are very generally copolymers, preferably built up from at least two of the following monomers: ethylene, propylene, butadiene, isobutene, isoprene, chloroprene, vinyl acetate, styrene, acrylonitrile and (meth)acrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, 1961), pp. 392 to 406 and in the monograph by C. B. Bucknall, "Toughened Plastics" (Applied Science Publishers, London, 1977).

Some preferred types of such elastomers are listed below.

Preferred types of such elastomers are the ethylene-propylene rubbers (EPM) and the ethylene-propylene-diene rubbers (EPDM).

EPM rubbers generally have virtually no residual double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo(5.2.1.0.2.6)-3,8-decadiene or mixtures of these. Preference is given to hexa-1,5-diene, 5-ethylidenenorbornene and dicyclopentadiene. The diene content of the EPDM rubbers is preferably from 0.5 to 50% by weight, in particular from 1 to 8% by weight, based on the total weight of the rubber.

EPM or EPDM rubbers may preferably also be grafted with reactive carboxylic acids or their derivatives, for example acrylic acid, methacrylic acid or their derivatives, such as glycidyl (meth)acrylate, or maleic anhydride.

Copolymers of ethylene with acrylic acid and/or methacrylic acid and/or the esters of these acids are a further group of preferred rubbers. The rubbers may also include dicarboxylic acids, such as maleic acid and fumaric acid, or derivatives of these acids, eg. esters and anhydrides, and/or epoxy-containing monomers. These dicarboxylic acid derivatives or epoxy-containing monomers are preferably incorporated in the rubber by addition, to the monomer mixture, of monomers containing dicarboxylic-acid and/or epoxy groups of the formula I, II, III or IV $$R^1C(COOR^2)=C(COOR^3)R^4 \quad (I)$$

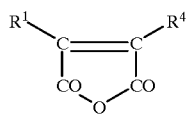
(II)

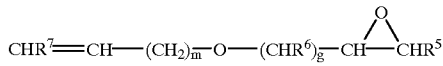
(III)

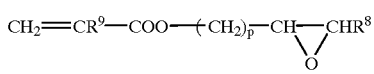
(IV)

where $R^1$ to $R^9$ are hydrogen or alkyl having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing (meth)acrylates, such as glycidyl (meth)acrylate, and the esters with tertiary alcohols, such as tert-butyl acrylate. Although these latter have no free carboxyl groups, their behavior approaches that of the free acids, and they are therefore referred to as monomers with latent carboxyl groups.

The copolymers advantageously consist of from 50 to 98% by weight of ethylene, from 0.1 to 20% by weight of epoxy-containing monomers and/or monomers containing methacrylic acid and/or acid anhydride groups, the residual amount being (meth)acrylates.

| Particular preference is given to copolymers of | |
|---|---|
| from 50 to 98% by weight, | in particular from 55 to 95% by weight, of ethylene, |
| from 0.1 to 40% by weight, | in particular from 0.3 to 20% by weight, of glycidyl acrylate and/or glycidyl methacrylate, (meth)acrylic acid and/or maleic anhydride, and |
| from 1 to 45% by weight, | in particular from 10 to 40% by weight, of n-butyl acrylate and/or 2-ethylhexyl acrylate. |

Other preferred acrylates and/or methacrylates are methyl, ethyl, propyl, isobutyl and tert-butyl (meth)acrylates.

Besides these, vinyl esters and vinyl ethers may also be employed as comonomers.

The ethylene copolymers described above may be prepared by processes known per se, preferably by random copolymerization under elevated pressure and temperature. Corresponding processes are well known.

Other preferred elastomers are emulsion polymers whose preparation is described, for example, by Blackley in the monograph "Emulsion Polymerization". The emulsifiers and catalysts which may be used are known per se.

In principle, both elastomers with a homogeneous construction and those with a shell construction may be employed. The shell-type construction depends on the addition sequence of the individual monomers; the morphology of the polymers is also influenced by this addition sequence.

Compounds which may be mentioned here merely as examples of monomers for preparing the elastic part of the elastomers are acrylates, for example n-butyl acrylate and 2-ethylhexyl acrylate, the corresponding methacrylates, butadiene and isoprene and mixtures of these. These monomers may be copolymerized with other monomers, such as styrene, acrylonitrile, vinyl ethers and other acrylates or methacrylates, such as methyl methacrylate, methyl acrylate, ethyl acrylate and propyl acrylate.

The soft or elastic phase (with a glass transition temperature of less than 0° C.) of the elastomers can be the core, the outer shell or an intermediate shell (in elastomers having a construction involving more than two shells); multishell elastomers may also have a number of shells formed from an elastic phase.

If one or more hard components (with glass transition temperatures of greater than 20° C.) are also involved, besides the elastic phase, in the construction of the elastomer, these are generally prepared by polymerization of styrene, acrylonitrile, methacrylonitrile, α-methylstyrene, p-methylstyrene, or acrylates or methacrylates, such as methyl acrylate, ethyl acrylate and methyl methacrylate, as main monomers. Besides these, smaller amounts of other comonomers may also be employed here.

In a number of cases, it has proven advantageous to employ emulsion polymers having reactive groups at the surface. Groups of this type are, for example, epoxy, carboxyl, latent carboxyl, amino and amido, and functional groups which can be introduced by additional use of monomers of the formula

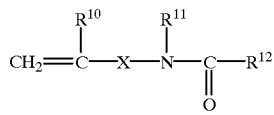

where $R^{10}$ is hydrogen or $C_1$–$C_4$-alkyl, $R^{11}$ is hydrogen, $C_1$–$C_8$-alkyl or aryl, in particular phenyl, $R^{12}$ is hydrogen, $C_1$–$C_{10}$-alkyl, $C_6$–$C_{12}$-aryl or —$OR^{13}$ $R^{13}$ is $C_1$–$C_8$-alkyl or $C_6$–$C_{12}$-aryl, each of which may be substituted with oxygen- or nitrogen-containing groups, X is a chemical bond, $C_1$–$C_{10}$-alkylene or $C_6$–$C_{12}$-arylene or

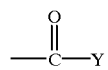

Y is O—Z or NH—Z and

Z is $C_1$–$C_{10}$-alkylene or $C_6$–$C_{12}$-arylene.

The graft monomers described in EP-A 208 187 are also suitable for introducing reactive groups at the surface.

Further examples are acrylamide, methacrylamide, and substituted acrylates and methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The constituents of the elastic phase may also be crosslinked. Monomers which act as crosslinkers are, for example, buta-1,3-diene, divinylbenzene, diallyl phthalate, dihydrodicyclopentadienyl acrylate and the compounds described in EP-A 50 265.

Use may, furthermore, also be made of graft-linking monomers, ie. monomers having two or more polymerizable double bonds which react at different rates during polymerization. Preference is given to using those compounds in which at least one reactive group polymerizes at about the same rate as the remaining monomers, whereas the other reactive group(s), for example, polymerize(s) significantly more slowly. The different polymerization rates give rise to a certain proportion of unsaturated double bonds in the elastomer. If a further phase is then grafted onto an elastomer of this type, at least some of the double bonds in the elastomer react with the graft monomers to form chemical bonds, ie. the grafted phase is, at least to some extent, linked to the graft base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate, and the corresponding monoallyl compounds of these dicarboxylic acids. In addition, there is a wide variety of other suitable graft-linking monomers; further details may be found, for example, in U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below, beginning with graft polymers which have a core and at least one outer shell, and which have the following construction:

| Type | Monomers for the core | Monomers for the shell |
|------|----------------------|------------------------|
| I | Buta-1,3-diene, isoprene, n-butyl acrylate, ethylhexyl acrylate or mixtures of these | Styrene, acrylonitrile, methyl methacrylate |
| II | As I but with additional use of crosslinkers | As I |
| III | As I or II | n-Butyl acrylate, ethyl acrylate, methyl acrylate, buta-1,3-diene, isoprene, ethylhexyl acrylate |
| IV | As I or II | As I or III but with additional use of monomers with reactive groups as described herein |
| V | Styrene, acrylonitrile, methyl methacrylate or mixtures of these | First shell of monomers as described under I and II for the core<br>Second shell as described under I or IV for the shell |

These graft polymers, in particular ABS and/or ASA polymers in amounts of up to 40% by weight, are preferably employed for impact modification of PBT, if appropriate, in a mixture with up to 40% by weight of polyethylene terephthalate. Blends of this type are obtainable under the trademark Ultradur®S (previously Ultrablend® (BASF AG)). ABS/ASA mixtures with polycarbonates are commercially obtainable under the trademark Terblend® (BASF AG).

Instead of graft polymers with a multishell construction, homogeneous, ie. single-shell, elastomers of buta-1,3-diene, isoprene and n-butyl acrylate or copolymers of these may also be employed. These products may also be prepared with additional use of crosslinking monomers or monomers with reactive groups.

Examples of preferred emulsion polymers are n-butyl acrylate-(meth)acrylate copolymers, n-butyl acrylate-glycidyl acrylate and n-butyl acrylate-glycidyl methacrylate copolymers, graft polymers with an inner core of n-butyl acrylate or based on butadiene and an outer shell of the abovementioned copolymers and copolymers of ethylene with comonomers which provide reactive groups.

The elastomers described may also be prepared by other conventional processes, for example by suspension polymerization.

Preference is likewise given to silicone rubbers, as described in DE-A 37 25 576, EP-A 235 690, DE-A 38 00 603 and EP-A 319 290.

Mixtures of the rubber types mentioned above may, of course, also be employed.

Examples of fibrous or particulate fillers are carbon fibers, glass fibers, glass beads, amorphous silica, asbestos, calcium silicate, calcium metasilicate, magnesium carbonate, kaolin, chalk, quartz powder, mica, barium sulfate and feldspar, employed in amounts of up to 50% by weight, in particular from 5 to 40% by weight.

Preferred fibrous fillers are carbon fibers, aramid fibers and potassium titanate fibers, glass fibers in the form of E glass being particularly preferred. These may be used as rovings or chopped glass in the commercially available forms.

For better compatibility with the thermoplastic, the fibrous fillers may be pretreated on the surface with a silane compound.

Suitable silane compounds are those of the formula III

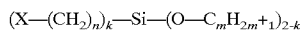

III where:

X is NH2—,

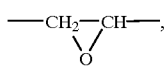

HO—, n is an integer from 2 to 10, preferably 3 or 4 m is an integer from 1 to 5, preferable 1 or 2, k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which have glycidyl as substituent X.

The silane compounds are generally used for surface coating in amounts of from 0.05 to 5% by weight, preferably from 0.5 to 1.5% by weight, and in particular from 0.8 to 1% by weight (based on D).

Acicular mineral fillers are also suitable.

For the purposes of the invention, the term acicular mineral fillers is taken to mean mineral fillers with pronounced acicular character, for example acicular wollastonite. The mineral preferably has a L/D (length/diameter) ratio of from 8:1 to 35:1, preferably from 8:1 to 11:1. The mineral filler may, if desired, be pretreated with the abovementioned silane compounds; the pretreatment is, however, not essential.

Other examples of fillers are kaolin, calcined kaolin, wollastonite, talc and chalk.

The novel thermoplastic molding compositions may contain, as component D), conventional processing aids, such as stabilizers, oxidation inhibitors, thermal and UV stabilizers, lubricants, mold-release agents, colorants, such as dyes and pigments, nucleating agents, plasticizers, etc.

Examples of oxidation inhibitors and thermal stabilizers are sterically hindered phenols, hydroquinones, aromatic secondary amines such as diphenylamines, and various substituted representatives of these groups, and mixtures of these in concentrations of up to 1% by weight, based on the weight of the thermoplastic molding compositions.

Examples of UV stabilizers, generally used in amounts of up to 2% by weight, based on the molding composition, are various substituted resorcinols, salicylates, benzotriazoles and benzophenones.

Inorganic pigments, such as titanium dioxide, Ultramarine blue, iron oxide and carbon black, and organic pigments, such as phthalocyanines, quinacridones and perylenes, and dyes, such as nigrosin and anthraquinones, may be added as colorants.

Sodium phenylphosphinate, alumina or silica and preferably talc may be added as nucleating agent.

Lubricants and mold-release agents, which are usually employed in amounts of up to 1% by weight, are preferably long-chain fatty acids (eg. stearic acid and docosanoic acid) or low-molecular-weight polyethylene waxes or polypropylene waxes.

Examples of plasticizers are dioctyl phthalate, dibenzyl phthalate, butyl benzyl phthalate, hydrocarbon oils and N-(n-butyl)benzenesulfonamide.

The novel molding compositions may also include from 0 to 2% by weight of fluorine-containing ethylenic polymers. These are ethylenic polymers with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with smaller proportions (generally up to 50% by weight) of copolymerizable ethylenically unsaturated monomers. These are described, for example, by Schildknecht in "Vinyl and Related Polymers", Wiley-Verlag, 1952, pp. 484 to 494 and by Wall in "Fluoropolymers" (Wiley Interscience, 1972).

These fluorine-containing ethylenic polymers are homogeneously distributed in the molding compositions and preferably have a particle size $d_{50}$ (number average) in the range from 0.05 to 10 $\mu$m, in particular from 0.1 to 5 $\mu$m. These low particle sizes may particularly preferably be achieved by the use of aqueous dispersions of fluorine-containing ethylenic polymers and by incorporating these in a polyester melt.

To improve compatibility with the thermoplastic polyesters, minerals and fillers are, if desired, equipped with a bonding agent. Glycidyl-, vinyl- and aminoalkyltrialkoxysilanes are preferred.

The novel thermoplastic molding compositions can be prepared by, processes known per se, by mixing the starting components in conventional mixing apparatus such as screw-extruders, Brabender mixers or Banbury mixers, and then extruding them. After extrusion, the extrudate can be cooled and comminuted. It is also possible to premix individual components and then to add the remaining starting materials, either individually or mixed. The mixing is generally carried out at from 230 to 290° C.

In a preferred method of operation, components B) and C) and, if desired, conventional additives D) can be mixed with a polyester prepolymer, compounded and granulated. The resultant granules are then subjected in solid phase to continuous or batch condensation under inert gas at a temperature below the melting point of component A), until the desired viscosity is reached.

The novel thermoplastic molding compositions have good flame retardancy and at the same time pass the glowing-wire test. They are suitable for producing fibers, films and shaped articles, in particular for applications in the electrical and electronics sectors. Particular applications are lamp parts, such as lamp sockets and lamp holders, plugs and multipoint connectors, coil formers, casings for capacitors or connectors, and circuit-breakers, relay housings and reflectors.

EXAMPLES

Component A): Polybutylene terephthalate with a viscosity number of 130 ml/g and a content of carboxyl end groups of 34 mval/kg (Ultradur B 4500 from BASF AG) (viscosity number measured in 0.5% strength by weight solution of phenol/o-dichlorobenzene, 1:1 mixture, at 25° C.).

Component B): Melamine cyanurate

Component C):

C1: Triphenylphosphine oxide

C2: Triphenylphosphine sulfide

C3: Triphenylphosphine

Component D): Chopped glass fiber with a thickness of 10 μm. (epoxysilanized size)

Components A) to D) were blended in a twin-screw extruder at from 250 to 260° C., and extruded into a waterbath. After granulation and drying, test specimens were injection molded and tested.

The flammability test was carried out according to UL 94 on 1/16 inch test specimens with the usual conditioning.

The glowing-wire test was carried out according to VDE 0471, Part 2-1, on disks of thickness 1, 2 and 3 mm and diameter 70 mm.

The formulations of the molding compositions and the results of the measurements are seen in the Table.

TABLE

| Test | Formulation in % by weight | UL 94 1/16" | Dripping of flaming particles | Glowing wire 960° C. |
|---|---|---|---|---|
| 1 | 70A, 10B, 20C1 | V–0 | no | pass |
| 2 | 70A, 15B, 15C1 | V–0 | no | pass |
| 3 | 40A, 15B, 20C1, 25D | V–0 | no | pass |
| 4 | 70A, 10B, 20C2 | V–0 | no | pass |
| 5 | 70A, 15B, 15C2 | V–0 | no | pass |
| 6 | 40A, 15B, 20C2, 25D | V–0 | no | pass |
| 7 | 70A, 10B, 20C3 | V–0 | no | pass |
| 8 | 70A, 15B, 15C3 | V–0 | no | pass |
| 9 | 40A, 15B, 20C3, 25D | V–0 | no | pass |
| Comparison 1 | 85A, 15B | V–2 | yes | pass |
| Comparison 2 | 60A, 15B, 25D | V–2 | yes | fail |

We claim:

1. A thermoplastic molding composition comprising
   A) from 30 to 97% by weight of a polyester,
   B) from 1 to 30% by weight of melamine cyanurate,
   C) from 1 to 30% by weight of at least one phosphorus-containing flame retardant which contains phosphorus in the valence state −1, −2 or −3,
   D) from 0 to 60% by weight of other additives and processing aids,
   where the total of the percentages by weight of components A) to D) is 100%.

2. A thermoplastic molding composition as defined in claim 1, containing, as flame retardant C), at least one phosphine oxide of the formula I

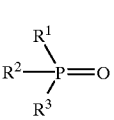

where $R^1$, $R^2$ and $R^3$ are identical or different alkyl, aryl, alkylaryl or cycloalkyl having from 8 to 40 carbon atoms.

3. A thermoplastic molding composition as defined in claim 1, in which component C) is built up from triphenylphosphine oxide, triphenylphosphine sulfide or triphenylphosphine or mixtures of these.

4. A thermoplastic molding composition as defined in claim 1, containing from 1 to 40% by weight of a fibrous filler as component D).

5. A thermoplastic molding composition as defined in claim 1, in which polybutylene terephthalate or polyethylene terephthalate or a mixture of these is employed as polyester A).

6. A thermoplastic molding composition as defined in claim 1 which is formed into fibers, films or shaped articles.

7. A shaped article obtained from a thermoplastic molding composition as defined in claim 1.

8. A thermoplastic molding composition as defined in claim 2, in which component C) is built up from triphenylphosphine oxide, triphenylphosphine sulfide or triphenylphosphine or mixtures of these.

9. A thermoplastic molding composition as defined in claim 3, in which polybutylene terephthalate or polyethylene terephthalate or a mixture of these is employed as polyester A).

* * * * *